Ｕnited States Patent [19]

Gaal

[11] Patent Number: 5,038,512
[45] Date of Patent: Aug. 13, 1991

[54] WEIGHT FORWARD SPINNING LURE WITH SCOOP

[75] Inventor: Rudolph T. Gaal, Parma, Ohio

[73] Assignee: Pa's Fishing Lures, Inc., Parma, Ohio

[21] Appl. No.: 395,477

[22] Filed: Aug. 18, 1989

[51] Int. Cl.$^5$ ............................................. A01K 85/00
[52] U.S. Cl. ................................... 43/42.19; 43/42.47
[58] Field of Search ................. 43/42.15, 42.16, 42.17, 43/42.18, 42.19

[56] References Cited

U.S. PATENT DOCUMENTS

| | | | |
|---|---|---|---|
| 2,025,270 | 12/1935 | Chaney | 43/42.15 |
| 2,482,648 | 9/1949 | Brandt | 43/42.16 |
| 2,694,877 | 11/1954 | Wise | 43/42.47 |
| 2,743,545 | 5/1956 | Seneker | 43/42.47 |
| 2,775,840 | 1/1957 | Dumas | 43/42.16 |
| 2,825,172 | 3/1958 | Bohley | 43/42.16 |
| 3,104,486 | 9/1963 | Gressand | 43/42.17 |
| 3,423,868 | 1/1969 | Master | 43/42.15 |
| 3,604,140 | 9/1971 | Nelson | 43/42.19 |
| 3,987,576 | 10/1976 | Stader | 43/42.16 |
| 4,445,294 | 5/1984 | Gowing | 43/42.47 |
| 4,739,576 | 4/1988 | Davis | 43/42.47 |

4,777,761 10/1988 Renaud ........................ 43/42.47

OTHER PUBLICATIONS

Johnny Morris–Bass Pro Shops, 1989 Catalog, p. 160, The Dredge, mdl. DKB2D etc.
Jointed Darter, O. W. Tackle, c/o Mr. Michael Kobylka 1319 West 13, Lorain, Ohio 44052.

Primary Examiner—Kurt Rowan
Assistant Examiner—James Minen
Attorney, Agent, or Firm—Fay, Sharpe, Beall, Fagan, Minnich & McKee

[57] ABSTRACT

A weight forward spinning lure for spin casting, drift fishing, or trolling, having a weighted body section comprising a keeled head portion and a scoop portion. The keeled head portion is fashioned to receive the scoop portion at an angle whereby the scoop portion, in association with the keel head portion, provides stability and enables the lure to follow a generally horizontal path as the lure travels through water. A deep dive with a minimum amount of line out to approximate the use of a downrigger is obtainable through selection of size of scoop and weight of keeled head.

6 Claims, 3 Drawing Sheets

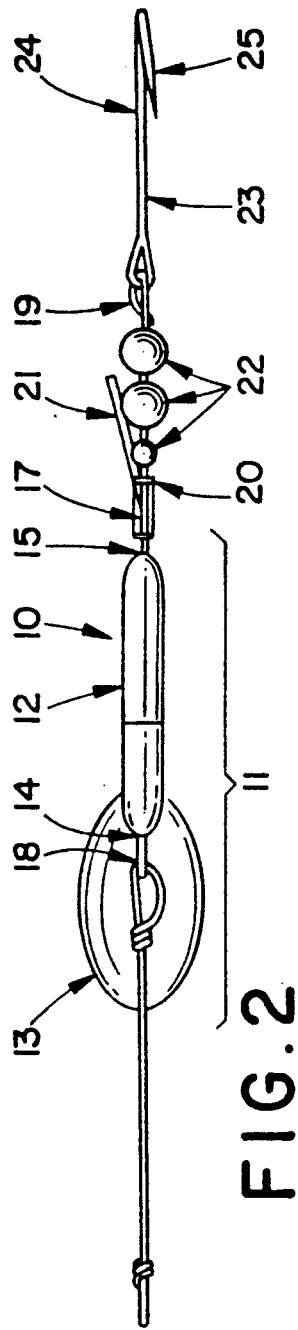
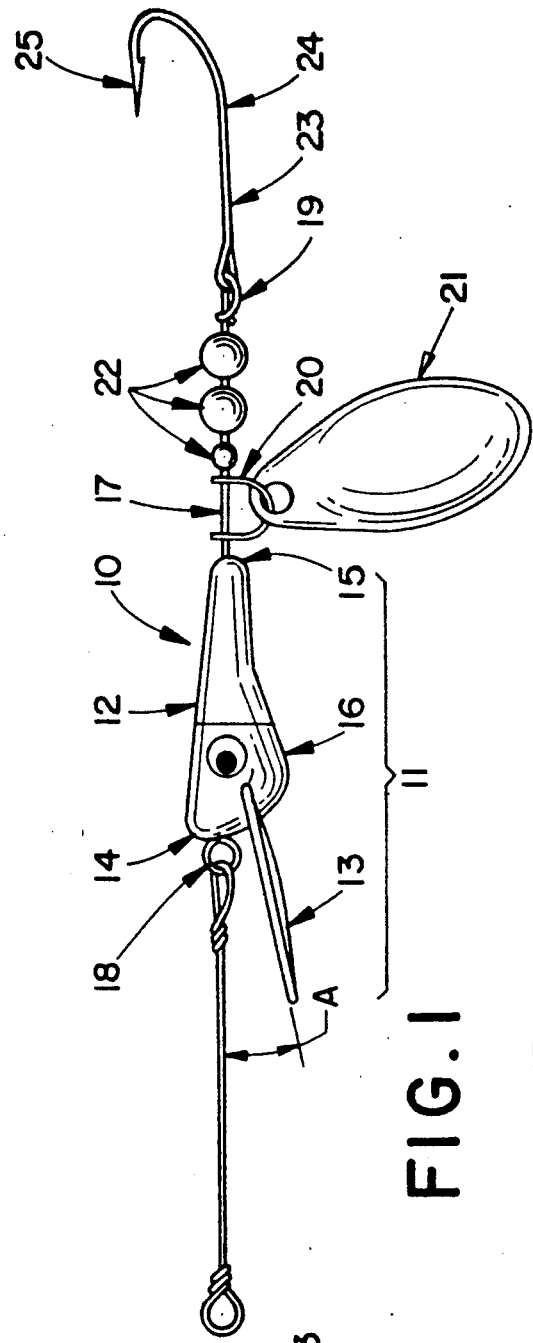
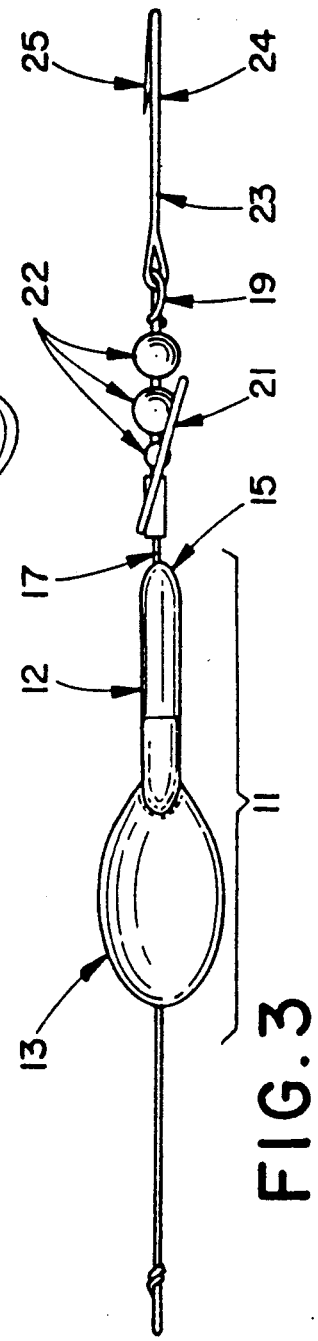
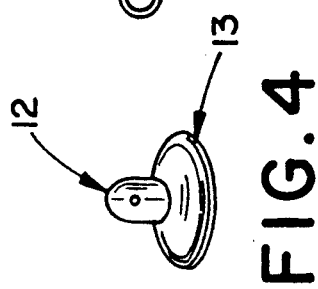

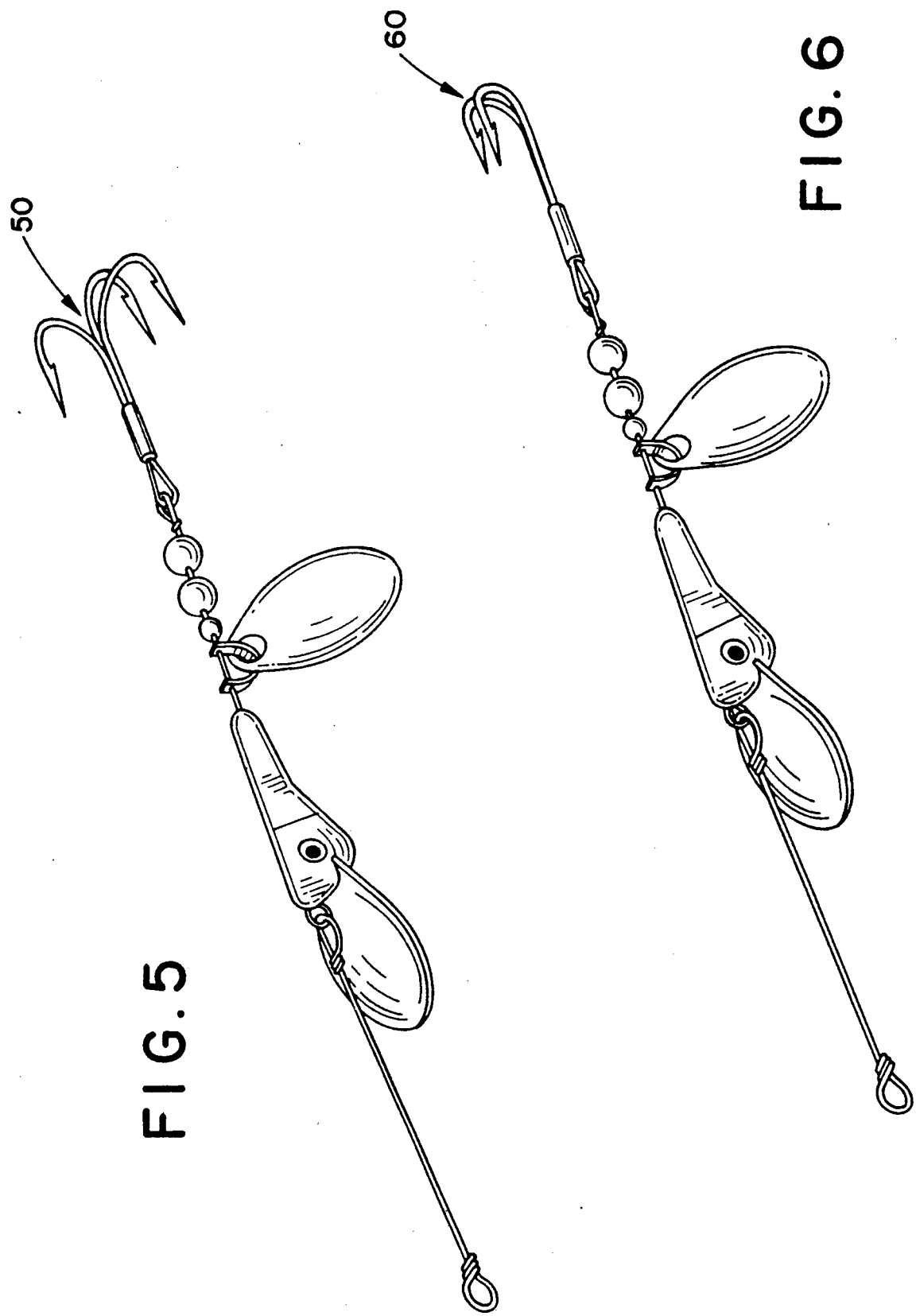

WEIGHT FORWARD SPINNING LURE WITH SCOOP

BACKGROUND OF THE INVENTION

The present invention relates to fishing lures and especially to the type used for spin casting, drift fishing, or trolling. More specifically, the present invention relates to fishing lures commonly referred to as "weight forward spinning lures".

Weight forward spinning lures generally comprise a combination of three separate and distinct body parts. First, a weighted body portion to aid in casting and trolling, both activities sensitive to the weight of the lure. Next, trailing the weighted body portion, a reflective or brightly colored spinning blade or a propeller-like surface is provided to rotate as the lure travels through the water. Lastly, the third and final body part consists of a hook which may be baited.

Many prior art lures have been designed to resemble bait fish or other live bait upon which game fish feed. Other lures rely upon combinations of bright colors and highly reflective surfaces, designed to spin or otherwise rotate to entice game fish to strike. The basic weight forward spinning lure is of this latter type and is designed with a keeled head to prevent line twist caused by the rotation of the lure as it moves through the water. When retrieved or when trolling, the action of the lure consists of a spinner blade which revolves about the lure's center line in a trailing fashion. Sun, penetrating the water's surface, is reflected off the face of the spinner, attracting the attention of fish. To otherwise tempt fish to strike, a single hook is provided which may be baited with nightcrawlers or other fist bait.

Conventional weight forward spinning lures tend to rise toward the surface when retrieved or when trolled. When the lure is allowed to first settle to the lake bed, then retrieved, the path of the lure is generally along the hypotenuse of the right triangle formed from the boat to the lake bed beneath the boat, then to the point where the lure came to rest. Often this path of movement is undesirable because the fish tend to school at a generally common depth so most of the lure movement along the hypotenuse path will be away from the fish. For maximum effectiveness, lures of the prior art were used in conjunction with downriggers.

A downrigger consists of a short rigid rod and reel fixed to a boat and is fashioned to receive an accompanying conventional rod and reel. A heavy finned weight is provided which may be lowered into the water at a precise depth. A fishing line is loosely attached to the finned weight along with the accompanying rod and reel so as to allow the line to trail the finned weight when trolling. Upon a strike, the fishing line detaches from the finned weight and the fish may be retrieved conventionally using the rod and reel. To reestablish the rigging, the finned weight must first be retrieved to the surface of the water whereupon the fishing line may once again be loosely connected and lure re-baited. The finned weight is then again lowered to the desired depth where upon fishing will be resumed.

The present invention is directed to solving this problem by the addition of a foil or scoop to the keeled head to allow the lure to follow a path that more closely approximates the result heretofore obtainable only through the use of a downrigger. When retrieved or trolled, the lure of the present invention travels in a plane at a constant depth in which a school of fish may be suspended. The special keeled head of the present invention is designed to work in conjunction with the scoop to provide stability, enabling the lure to maintain proper orientation under all circumstances.

The scooped lures of the prior art are manufactured generally to resemble bait fish. These lures are commonly referred to as "diving plugs". A unique characteristic of the diving plug is it's buoyancy, causing the lure to tend toward the surface when neither retrieved nor trolled. However, as the lure is forced to travel through the water, the scooped portion forces the otherwise buoyant lure to dive at a depth specified by a combination of factors. Because of the hydrodynamic forces involved, along with the buoyancy of the lure, diving plugs tend to wobble as they travel through the water. It is this wobble action along with the appearance of the lure that attracts fish.

SUMMARY OF THE INVENTION

The present invention comprises a fishing lure having a weighted body section, a spinner blade section, and a hook section. The hook section may be skirted with plastic or rubber bucktail or rigged with live or other fish bait. The spinner blade of the present invention is fastened to the lure through the use of a clevis which allows the spinner to revolve about the center line of the lure in a trailing fashion as the lure travels through the water.

An important feature of the present invention lies in the weighted body section which includes an elongated keeled head portion and a scoop portion. As the lure travels through the water, the scoop portion forces the lure to dive deeper into the water. The special keeled head portion of the present invention working in association with the scoop provides stability, enabling the lure to maintain proper orientation under all circumstances.

More particularly, without the use of a downrigger, the lures of the prior art tend toward the surface when trolled due to the hydrodynamic forces involved. Indeed, if the trolling rate is too fast, the conventional weight forward spinning lure may even skip along the surface of the water defeating its usefulness. Since the fish targeted by this type of lure generally school in loose horizontal planes and remain there suspended a fair amount of time, standard weight forward spinning lures virtually mandate the use of a downrigger to fix the depth at which the lure travels when trolled.

The disadvantages of downriggers are numerous. The most obvious disadvantage is the cost involved. One downrigger may cost several hundred dollars, not including the traditional rod and reel combination needed to work in conjunction with the downrigger. Another disadvantage is the fishing time lost due to the rigging requirements involved with the use of a downrigger. Each time a fish is caught the finned weight of the downrigger must be retrieved to the surface so that the fishing line may once again be loosely connected to the finned weight then lowered to the desired depth.

The keeled head in conjunction with the foil or scoop surface of the present invention solves the above problem previously existent in the prior art. The surface area and pitch of the scoop of the present invention are critical in determining the depth at which the lure travels and proper selection ensures that the lure will travel at the desired depth. An advantage of the present invention is the elimination of the need for use of a downrigger when trolling. Another advantage is an improved lure for more efficient fishing.

BRIEF DESCRIPTION OF THE DRAWINGS

FIG. 1 is a side view of a fishing lure formed in accordance with the present invention;

FIG. 2 is a top elevational view of the lure of FIG. 1;

FIG. 3 is a bottom elevational view of the lure of FIG. 1;

FIG. 4 is a front view of the lure of FIG. 1;

FIG. 5 is a perspective view of a fishing lure of a second embodiment;

FIG. 6 is a perspective view of a fishing lure of a third embodiment;

DESCRIPTION OF THE PREFERRED EMBODIMENTS

Figure 7:
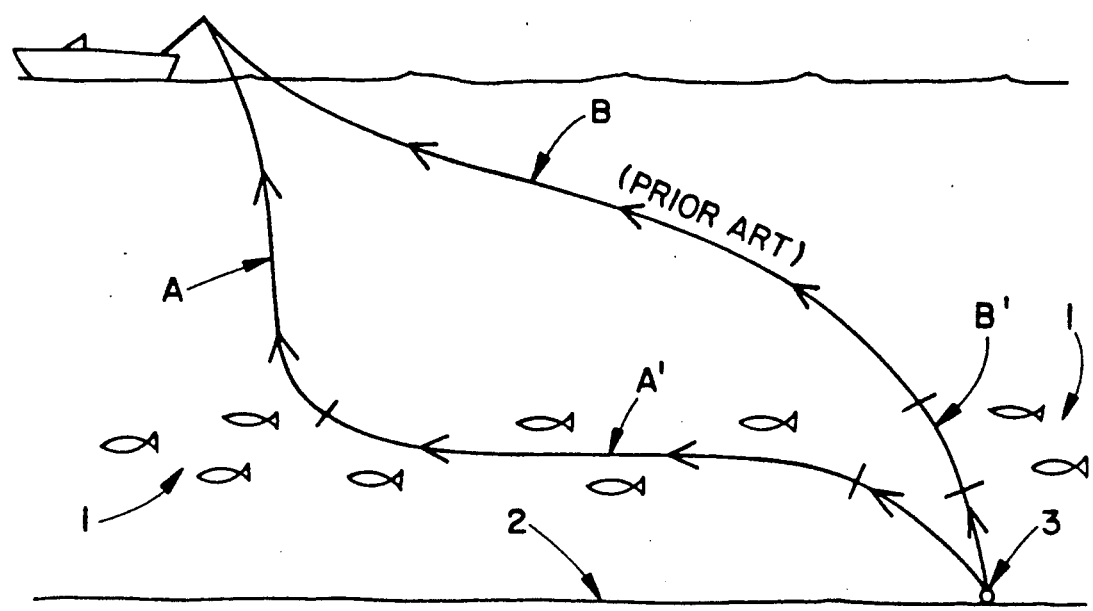
FIG. 7 is a side view of the paths followed by two lures when retrieved from a stationary boat; and, FIG. 8 is a side view of the paths followed by three lures when trolled behind a moving boat.

Referring to the drawings in detail, in FIGS. 1 through 4 inclusive and with particular reference to FIG. 1, a fishing lure 10 has a weighted body section 11 which includes an elongated keeled head portion 12 formed of lead or other suitable material and a scoop portion 13. The elongated keeled head has a front end 14, a tail end 15, and a belly side 16. Also, the keeled head is generally wider at the front end 14 fashioned to receive the scoop portion 13 at a first angle A.

Scoops of various sizes may be used as well as various sizes of keeled heads, both of which affect the performance of the lure. A larger scoop would have a larger cross-sectional area and thus undergo different hydrodynamic forces as it travels through the water. Another way to affect performance is through the selection of the scoop angle A. Generally, the larger the scoop angle A, the deeper the dive as the lure is retrieved until an equilibrium depth is established at which time the lure no longer dives, but travels in a fixed horizontal plane. Similarly, the larger the cross-sectional area of the scoop 13, the greater the effect of the scoop on the lure's performance of the lure.

The keeled head is formed over a wire leader 17 which is bent to form an eyelet or hook 18 at the front end of the keeled head 14. The wire leader also extends rearwardly from the tail end of the keeled head 15 and is bent to form another eyelet or hook 19. The wire leader is made of thin gauge stainless steel or other suitable material selected to be bendable yet retain its shape once bent.

A slidable and rotatable clevis 20 is threaded onto the steel leader 17 between the tail end of the keeled head 15 and the loop or hook 19 but before the loop or hook is formed. Attached to the clevis 20 is a brightly colored or highly reflective spinning blade 21. As the lure is pulled through the water, the spinning blade 21 attached to the clevis 20, is affected by the forces of the water so as to rotate about the wire leader 17 in a trailing fashion.

Faceted plastic or reflective metal beads 22, slidable on the wire leader constitute the bearing surface against which the clevis 20 rotates.

Connected to the wire loop 19 is a fish hook 23, attached in such a manner as to curl away from the belly side 16 of the keeled head. The advantage of such an orientation is that the fishing lure is thus made snag-proof. Should the fishing lure of the present invention ever dive deep enough while trolling or otherwise so as to drag along the lake bed, the selected orientation permits the hook's shank 24 to drag, while the barbed end 25 remains free.

FIGS. 5 and 6 illustrate two other embodiments of the present invention. In place of the single hook 23 used in FIGS. 1 through 4, a treble hook 50 or a double hook 60 may be used. Depending upon the bait selected or the game fish sought, any one of the above embodiments may be preferred. Snag free operation may be obtained with the lure of FIG. 6 if the double hook 60 is oriented in a fashion similar to that of FIG. 1.

FIG. 7 represents a view of the path taken by the lure of the present invention A and of the prior art B when retrieved from a stationary fishing boat. The drawing assumes that the game fish sought 1 lie suspended at a certain depth and that both lures are permitted to settle to the same point 3 above the lake bed 2. Since weighted fishing lures generally sink at a rate of about 1.5 to 2.0 feet per second, a typical procedure used involves allowing the lure to sink for about 10 to 12 seconds before retrieving for fish suspended at 20 feet. When retrieved, the lure of the present invention follows the path A because of the novel keeled head and scoop combination. The standard weight forward spinning lure generally follows the path B. The advantage of path A over path B lies in the increased time the lure is presented to the fish. The fishing lure of the present invention is presented during the segment A' whereas the standard weight forward spinning lure is presented only during B'. The likelihood of success is thus increased along path A obtainable through use of the present invention.

Figure 8:
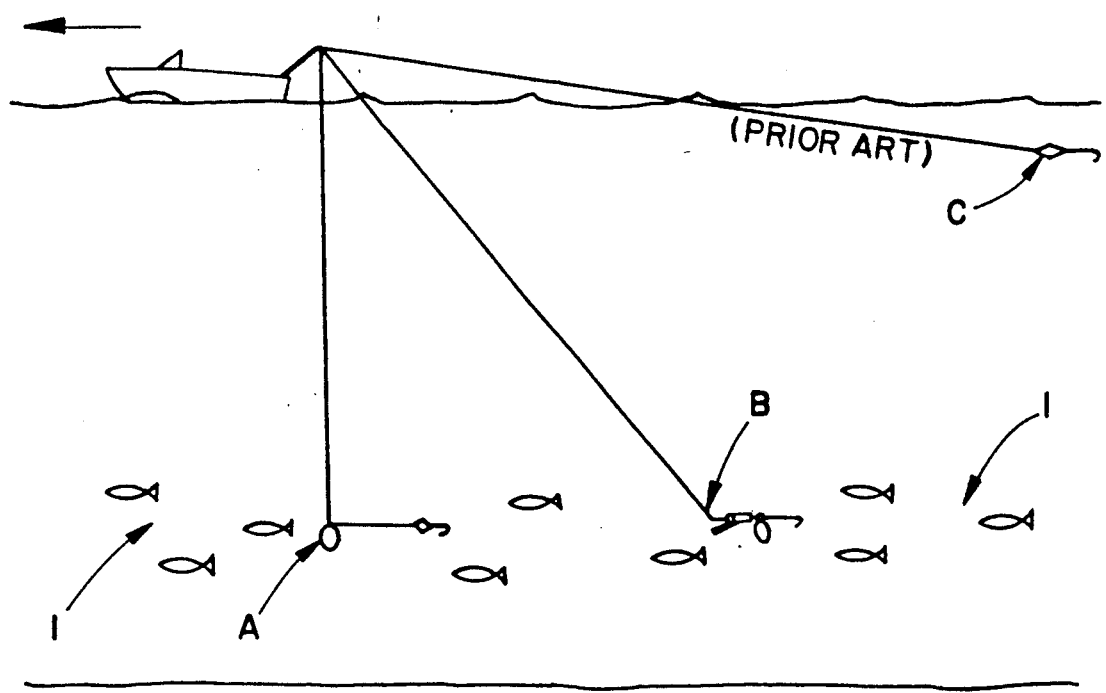

FIG. 8 represents a view of the relative depths assumed when trolling various combinations or when drift fishing under extra fast drift conditions. The use of a downrigger A will present the fishing lure at a fixed depth. The selection of a depth corresponding to that of a suspended school of game fish 1, will likely produce good results. The lure of the present invention will find a depth B similar to that of the downrigger A for a given selection of scoop size, scoop angle, and keeled head weight. The hydrodynamic forces involved will naturally force the standard weight forward spinning lure to the surface C when trolled. An advantage of the present invention is that it does away with the necessity for an expensive and complicated downrigger yet achieves the same result. Another advantage of the present invention is the reduction in the amount of line out to fish at a desired depth, thus reducing the chance of missing a bite due to line stretch and corresponding loss in sensitivity.

The invention has been described with reference to preferred and alternate embodiments. Obviously, modifications and alterations will occur to others upon a reading and understanding of this specification. It is intended to include all such modifications and alterations insofar as they come within the scope of the appended claims or the equivalents thereof.

Having thus described the invention, I claim:

1. A fishing lure comprising:
   a weighted body section including an elongated keeled head portion having a front end, a tail end, and a belly side, said weighted body section also including a fixed scoop portion operatively associated with the body section and an embedded wire leader bent to form a first eyelet or hook at the front end of said keeled head and extending rearwardly from the tail end of said keeled head bent to form a second eyelet or hook;

a slidable and rotatable clevis to which is attached a spinning blade;

at least one bead slidable on the wire leader extending rearwardly from said keeled head forming a bearing surface for said clevis;

stabilizing means for preventing the weighted body section from rotating about the first eyelet, while allowing the clevis to rotate, as the lure travels through the water, and;

a fish hook coupled to said second eyelet or hook.

2. The fishing lure in accordance with claim 1, in which said scoop portion has a forward facing concave surface.

3. The fishing lure of claim 2 wherein the stabilizing means comprises a generally planar keel, protruding from the belly side, to which the scoop portion is fixedly attached, the planar keel gradually thickening as it extends from the weighted body section.

4. The fishing lure of claim 3 wherein the elongated keeled head is solid and formed of metal and wherein the planar keel protrudes from the belly side from the front end to a point between the front end and the tail end.

5. The fishing lure in accordance with claim 1, in which said fish hook comprises a plurality of barbed hooks with a common shank.

6. The fishing lure in accordance with claim 1, in which said fish hook comprises two barbed hooks with a common shank oriented to ride with the points opposite said belly side.

* * * * *